United States Patent [19] [11] 3,735,052

Hoogendoorn et al. [45] May 22, 1973

[54] MAGNETIC HEAD ASSEMBLY USING TITANIUM DIOXIDE AND BARIUM TITANATE SLIDER

[75] Inventors: Helen M. Hoogendoorn, Schenectady, N.Y.; Charles M. McIntosh, Burlington, Vt.

[73] Assignee: International Business Machines Corporation, Armonk, N.Y.

[22] Filed: July 16, 1971

[21] Appl. No.: 163,196

Related U.S. Application Data

[62] Division of Ser. No. 6,865, Jan. 29, 1970, abandoned.

[52] U.S. Cl. .............179/100.2 C, 29/603, 106/39 R
[51] Int. Cl. .............................................G11b 5/14
[58] Field of Search ...............................179/100.2 C; 340/174.1 F; 346/74 MC; 106/39 R, 46; 252/63.5, 520

[56] References Cited

UNITED STATES PATENTS 3,562,444 2/1971 Hoogendoorn et al. .......179/100.2 C
2,626,220 1/1953 Thurnauer et al. .................106/39 R

OTHER PUBLICATIONS

W. D. Kingery, Introduction to Ceramics, 1960, John Wiley & Sons, pp. 478–486, Sci. Library No. TP 807 K5i.

*Primary Examiner*—Bernard Konick
*Assistant Examiner*—Jay P. Lucas
*Attorney*—Hanifin and Jancin

[57] ABSTRACT

A magnetic head assembly includes a glass-gapped ferrite head bonded into a ceramic slider with a glass. The slider is made of a ceramic composition consisting essentially of the reaction product of 70 to 85 percent, by weight, titanium dioxide ($TiO_2$) and 30–15 percent barium titanate ($BaTiO_3$). Infrared bonding is employed. Copper may be introduced into the ceramic composition to enhance its infrared absorption properties.

2 Claims, 7 Drawing Figures

INVENTORS
HELEN M. HOOGENDOORN
CHARLES M. McINTOSH
BY Theodore E. Galanthay
ATTORNEY

MAGNETIC HEAD ASSEMBLY USING TITANIUM DIOXIDE AND BARIUM TITANATE SLIDER

CROSS REFERENCE TO RELATED APPLICATION OR PATENT

Ser. No. 709,457, filed Feb. 29, 1968, now U.S. Pat. No. 3,562,444, inventors Hoogendoorn, et al. This is a Divisional Application of co-pending U.S. Pat. application Ser. No. 6865 filed on Jan. 29, 1970 now abandoned, and assigned to the assignee of this application.

BACKGROUND OF THE INVENTION

1. Field of the Invention

The invention relates to magnetic head assemblies such as those used for recording in magnetic disk files and the like. More specifically, this invention relates to a ceramic composition used in the manufacture of such magnetic head assemblies.

2. Description of the Prior Art

At present, one type of magnetic head assembly consists of a glass-gapped ferrite head, epoxy bonded into an alumina slider. The head is formed of two ferrite members separated by a gap filled with non-magnetic material, typically an organic material such as epoxy, which also bonds the members together. The head is machined to its finally desired width, positioned within the slot of a mounting structure of alumina slider, secured in place with an epoxy, placed into a conventional furnace to cure the epoxy material and thereby bond the head within the slider slot, and then polished to the finally desired gap height and smoothness.

Another type of magnetic head assembly, forming the subject matter of commonly assigned application Ser. No. 709,457 of Hoogendoorn, et al. filed Feb. 29, 1968, now U.S. Pat. No. 3,562,444, comprises a glass-gapped ferrite head bonded into a ceramic slider with a glass. The assembly is formed by initially placing the head in a slot in the slider in a position generally conforming to the finally desired assembled relationship and in such a manner as to establish a first region therebetween for reception of bonding material. Low temperature glass is located on top of the slider over the slot. The glass is heat flowed into the region between the head and slider. The heating continues until the region between the head and slider is filled. The assembly is then cooled.

In the next operation, the head is machined, as with a small diameter diamond saw wheel, in the gap region to its finally desired position and width, with the first mass of glass supporting the head during this step. This machining step is not essential, as for example the head might already be within tolerance limits. Moreover, this operation is not possible when epoxy is used instead of glass, due to the epoxy's instability to machining stresses. A second mass of glass is then heat flowed between the head and first mass of glass, but without disturbing the bond formed between the first mass of glass and the slider. Finally, after cooling, the protruding glass and ferrite head are ground and polished to the desired height and smoothness.

The so-called slider is the supporting structure into which the glass-gapped ferrite head is bonded with the glass, as set forth in the above referenced Application Ser. No. 709,457, now U.S. Pat. No. 3,562,444. It is also possible to bond a large number of glass-gapped ferrite heads into each ceramic slider thereby enabling magnetic reading or writing in a large number of channels simultaneously. In order to fabricate suitable ferrite head assemblies, a need developed for a slider material having a high coefficient of expansion. The slider material must also exhibit superior wear and polishing properties. This latter characteristic is needed in that the slider moves on a film of air in close proximity to the oxide surface of the record medium such as a magnetic disc, and the relative velocity between the two is very high. The prior art fails to teach such a material and the use of such material in improved ferrite head recording assemblies.

SUMMARY OF THE INVENTION

Accordingly, it is an object of this invention to provide an improved ferrite head recording assembly.

It is another object of this invention to provide an improved slider material for use in the fabrication of ferrite head recording assemblies.

It is a further object of this invention to provide a composition having a high coefficient of expansion, as well as good polishing and wear properties.

It is a still further object of this invention to provide a support structure composed of a material particularly adapted for glass sealing of intricate shapes.

In accordance with the invention, these and other objects are accomplished by fabricating the slider material from a material consisting essentially of the reaction product of titanium dioxide ($TiO_2$) and barium titanate ($BaTiO_3$). In a ferrite head assembly of a type described in the above referenced Application Ser. No. 709,457, now U.S. Pat. No. 3,562,444, the ferrite head and glass bonding material already have a large coefficient of expansion. In accordance with this invention, the slider material fabricated from a ceramic consisting primarily of approximately 80 percent by weight of titanium dioxide ($TiO_2$) and approximately 20 percent by weight of barium titanate ($BaTiO_3$) provides a slider material having a high coefficient of expansion of approximately $90 \times 10^{-7}$in./in./°C which matches that of the previously matched ferrite head and glass bonding material. The ceramic slider material can be lightly doped with an additive which renders it somewhat more infrared absorbent. A copper containing substance such as cupric oxide is a suitable additive. The disclosed ceramic slider material has additional advantages in being highly polishable and wear-resistant. This latter characteristic is necessary in that the slider material moves in close proximity to the oxide surface of the record medium such as a magnetic disc.

BRIEF DESCRIPTION OF THE DRAWINGS

The foregoing and other objects, features and advantages of the invention will be apparent from the following more particular description of the preferred embodiments of the invention as illustrated in the accompanying drawings wherein.

DESCRIPTION OF THE PREFERRED EMBODIMENTS

Figure 1:
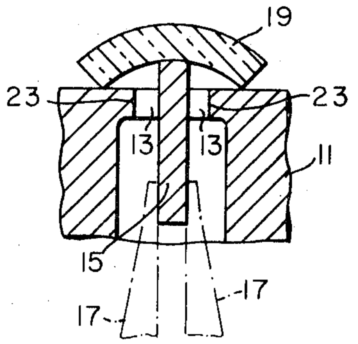
FIGS. 1 through 6 are successive, enlarged sections showing the fabrication of a glass-gapped ferrite head joined by glassing to the ceramic slider of this invention.

Referring now to the drawings and in particular to

FIG. 1, there is illustrated an early step in the fabrication of the magnetic head assembly with the slider material of the present invention. The ferrite head 15 which is to be bonded within the slot 13 of a supporting structure or slider 11 is temporarily held in position as by clamps 17 indicated with phantom lines. The head 15 is to be used for reading and erasing information on magnetic recording surfaces such as discs. The head material is a ferrite such as Ni-Zn having a coefficient of thermal expansion in the order of $90 \times 10^{-7}$in./in./°C. The glass bonding material 19 and ceramic slider material 11 must have a coefficient of expansion that closely matches that of the ferrite head 15 because a mismatch would result in fracturing of the completed magnetic head assembly, or the glass bond. The material of ceramic slider 11 must also be free from micro-cracks or micro-pores in order to suitably "slide" over the particular record medium. In order to fabricate suitable magnetic head assemblies, it has been found that the linear thermal coefficient of expansion of the three elements, i.e. ferrite head 15, glass 19, and slider 11, must be within close tolerance limits of the nominal linear thermal coefficient of expansion of the ferrite head 15, which in this illustration is $90 \times 10^{-7}$in./in/°C. It is important that the coefficient of expansion be well matched linearly throughout the particular temperature range so as to minimize delayed stresses.

In order to provide a suitable material for slider 11, it has been found that a compound consisting of approximately 80 percent by weight of titanium dioxide ($TiO_2$) and 20 percent barium titanate ($BaTiO_3$) provides a slider material within the given tolerance limits for the coefficient of expansion as well as providing the suitable wear and polishing properties. In respect to the surface finish of the ceramic slider material, the finish must be as good as most glasses; in this case the surface finish (smoothness) has a C.L.A. rating equal to four micro-inches. It has further been found that varying this composition from 70 percent by weight of titanium dioxide ($TiO_2$) and 30 percent of barium titanate ($BaTiO_3$) to 85 percent by weight of titanium dioxide ($TiO_2$) and 15 percent barium titanate ($BaTiO_3$) provides a suitable range of coefficients of expansion from $84 \times 10^{-7}$ to $93 \times 10^{-7}$ without adversely effecting the polishing and wear properties. Furthermore, the addition of a coloring agent such as cobalt, chromium, or copper tends to increase the infrared absorption of the ceramic slider material, in order to keep the infrared absorption properties of the ferrite head, glass, and slider substantially matched.

The ceramic slider material of this invention is fabricated from titanium dioxide ($TiO_2$) of the rutile grade. This is a pure grade of $TiO_2$ with stable characteristics and highly reproducible ceramic properties. Such rutile grade of $TiO_2$ was chosen as other grades might vary from batch to batch in their ceramic properties such as shrinkage, for example. The titanium dioxide ($TiO_2$, is mixed with barium titanate ($BaTiO_3$) and prepared by well known ceramic processes including steps such as ball milling, drying, pulverization, mixing with a binder, etc. The resultant material is then cast into sheets or pressed into desired shape and fired for approximately three hours at approximately 1,350°C. The expansion co-efficient of the resultant material is in the order of $90 \times 10^{-7}$in./in/°C. In the preferred embodiment, as exemplified by FIG. 1, the material for ceramic slider 11 is pressed into the particular shape indicated by means of high pressure dies. Firing at the stated temperature for the stated time densifies the material and assures that tolerances are better maintained.

Figure 2:
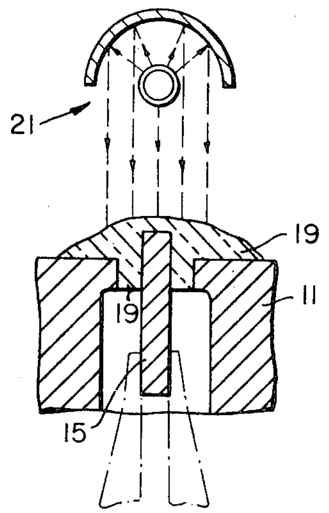

Referring now to FIG. 2, it is seen that glass 19 is flowed into the region between ferrite head 15 and slider 11 by the application of heat from a source such as infrared source 21. The source 21 heats the glass disc 19, ferrite head 15 and slider 11 in the area where bonding is desired but without significantly heating the clamping assembly 17 or associated elements, since the lamp's intensity decreases as the distance from the focal plane increases. Because the heating is localized, the tooling does not become subjected to high temperature exposure. This prevents damage to the tooling as well as expansion of same which can result in misalignment between the parts being held. The absorption of the glass 19 is matched to that of the ceramic slider 11 in order to prevent an excessive temperature gradient. A too strongly absorbing glass will melt before the slider has a chance to heat up and a cold seal could therefore result. Therefore, as a rule, the glass and slider should heat uniformly.

Figure 3:
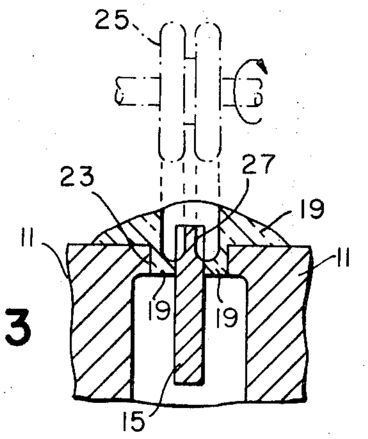
Figure 4:
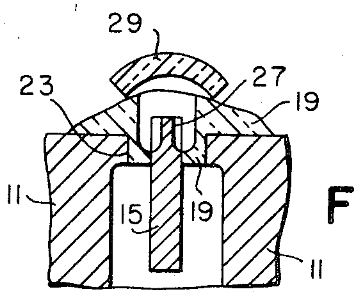
Figure 5:
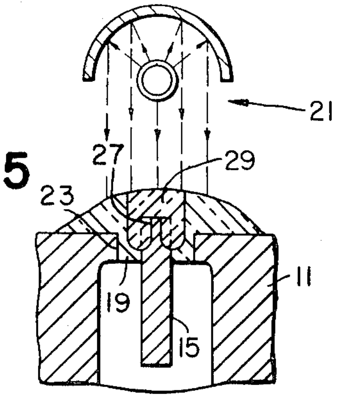
Figure 6:
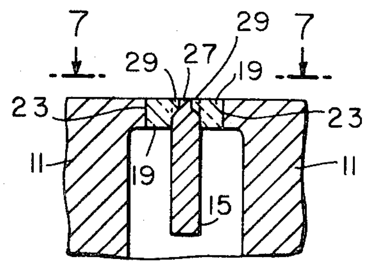
Figure 7:
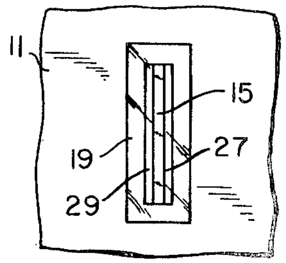
FIG. 7 is a plan view, broken away, of the completed magnetic head assembly fabricated with the ceramic slider material of this invention.

In the next operation depicted by FIG. 3, the head 15 is machined, as with a diamond saw wheel shown in phantom at 25, in order to bring ferrite head 15 to its desired width. This operation also assures an absolutely precise spacing of the extension 27 of magnetic head 15. As pointed out hereinbefore, this machining operation is optional as the head might already be within tolerance limits. Moreover, this operation is not possible if epoxy were used instead of glass, due to the epoxy's instability to machining stresses. As depicted in FIGS. 4 and 5, after the machining operation of FIG. 3, a new layer of glass 29 is heat flowed into the resultant cavity. The completed assembly is then machined to a highly polished smooth top surface as shown in FIGS. 6 and 7. For an even more detailed description of the fabrication of the completed magnetic head assembly, refer to the above referenced application, Ser. No. 709,457, now U.S. Pat. No. 3,562,444.

In conclusion, there has been described a ceramic material composed of 70 to 85 percent by weight of titanium dioxide ($TiO_2$) and 30 to 15 percent by weight barium titanate ($BaTiO_3$) which material has a very high coefficient of expansion in the order of $90 \times 10^{-7}$in./in./°C. In addition to the high coefficient of expansion, the material has exceptionally good polishing and wear properties which makes it particularly adaptable for use as a slider material in magnetic head assemblies. Furthermore, the addition of a small coloring agent such as copper increases the infrared absorbance of the slider material, making it comparable to that of the bonding glass.

While the invention has been particularly shown and described with reference to preferred embodiments, it will be understood by those skilled in the art that the foregoing and other changes in form and detail may be made therein without departing from the spirit and scope of the invention.

What is claimed is:

1. In a ferrite head assembly including a ferrite head having a pair of ferrite elements with a gap therebetween, said gap being filled with glass material which bonds said elements together;

a ceramic slider provided with a slot;

a sealing glass mechanically joining and bonding said head to said slider within said slot;

the improvement comprising:

the said ferrite head assembly in which the ceramic slider consists of a ceramic including by weight $TiO_2$ of the rutile grade, in substantially a percentage range between 70 percent and 85 percent and $BaTiO_3$ in a percentage range between 30 percent and 15 percent, the two elements combining to provide a coefficient of expansion which is substantially $90 \times 10^{-7}$in./in./°C.

2. A ferrite head assembly as in claim 1 additionally comprising:

an additive adapted to render the ceramic slider material infrared absorbent.

* * * * *